United States Patent [19]

Gresens

[11] Patent Number: 4,538,361

[45] Date of Patent: Sep. 3, 1985

[54] APPARATUS FOR THE TREATMENT OF CONTINUOUSLY TRANSPORTED LENGTHS OF TEXTILE MATERIAL WITH CIRCULATING AIR, ESPECIALLY A TENTERING FRAME DRYER

[75] Inventor: Harry Gresens, Benningen, Fed. Rep. of Germany

[73] Assignee: Bruckner Trockentechnik GmbH & Co. KG, Leonberg, Fed. Rep. of Germany

[21] Appl. No.: 575,868

[22] Filed: Feb. 1, 1984

[30] Foreign Application Priority Data

Feb. 14, 1983 [DE] Fed. Rep. of Germany ... 8304087[U]

[51] Int. Cl.³ .............................................. F26B 13/02
[52] U.S. Cl. ......................................... 34/82; 34/155; 55/294; 55/468
[58] Field of Search ................. 55/290, 294, 468, 267, 55/269; 34/158, 82, 155; 110/216, 217

[56] References Cited

U.S. PATENT DOCUMENTS

| | | | |
|---|---|---|---|
| 1,377,191 | 5/1921 | Eddy | 55/290 |
| 2,315,278 | 3/1943 | Shaw | 55/290 |
| 3,371,428 | 3/1968 | Thygeson, Sr. et al. | 34/158 |
| 3,472,002 | 10/1969 | Brown et al. | 55/290 |
| 4,183,150 | 1/1980 | Nash | 34/82 |

Primary Examiner—Larry I. Schwartz
Attorney, Agent, or Firm—Learman & McCulloch

[57] ABSTRACT

The invention relates to an apparatus for the treatment of continuously transported lengths of textile material comprising a housing within which is a rotatable drum filter, an extraction and cleaning nozzle extending approximately axially over the outer peripheral surface of said drum filter, and a blower and duct for establishing a circulating air stream through the textile material and the filter. Fibres extracted from the filter by the nozzle are conducted to and deposited on an air filter that also is located in the housing in a position to be readily accessible for maintenance.

13 Claims, 5 Drawing Figures

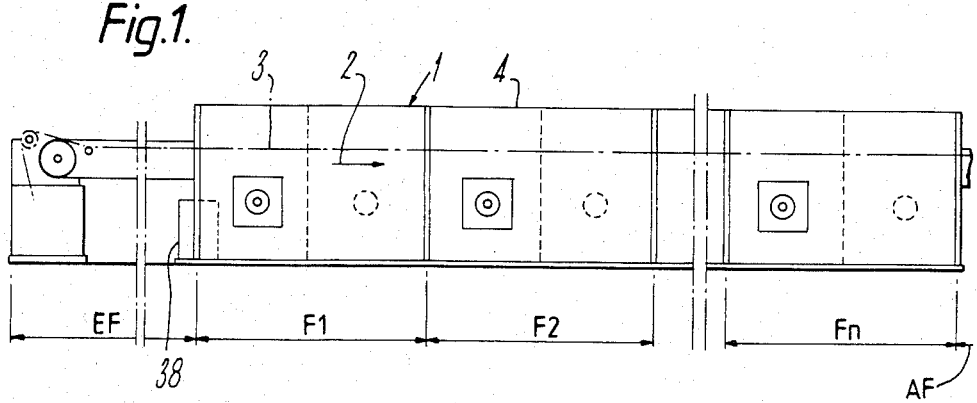
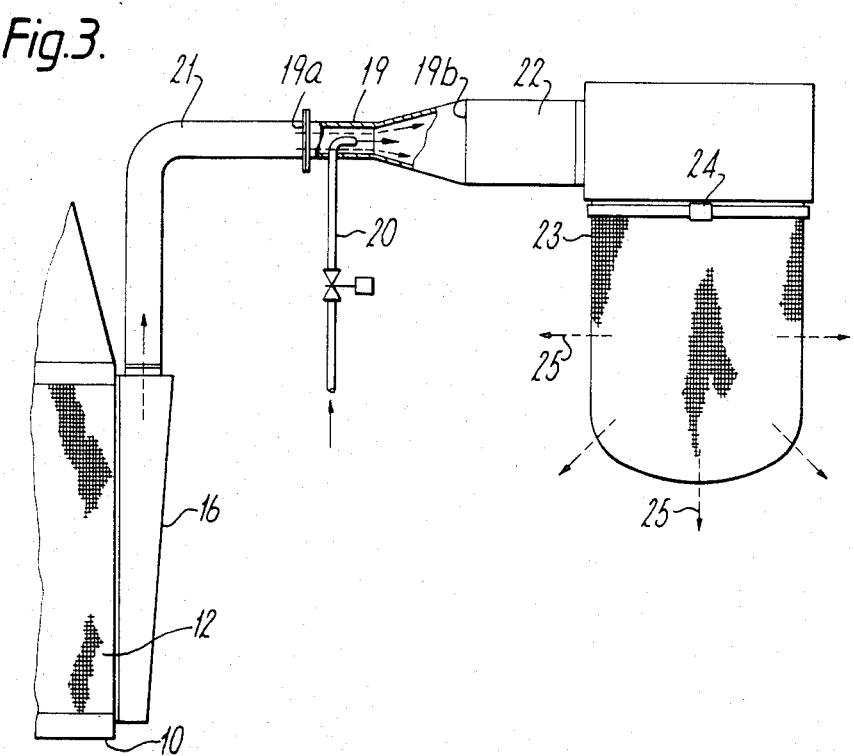

APPARATUS FOR THE TREATMENT OF CONTINUOUSLY TRANSPORTED LENGTHS OF TEXTILE MATERIAL WITH CIRCULATING AIR, ESPECIALLY A TENTERING FRAME DRYER

The invention relates to apparatus for the treatment of continuously transported lengths of textile material with circulating air, especially a tentering frame dryer.

As in many branches of industry, in the textile finishing industry there is an increasing tendency to automate machinery and equipment. This also applies to apparatus for treatment of textile material with circulating air, and particularly to tentering frame dryers and the like. After it has passed through or come into contact with the lengths of textile material, the air used for the treatment process which is circulating in such apparatus, that is to say air which is being re-used after appropriate regeneration, contains fluff, fibres or the like which must be removed from the air with the aid of a fibre filter before it passes through a heat exchanger and before it is delivered to the processing nozzles in order to prevent the fibres or fluff from causing blockages or other disruptions.

Various constructions of such fibre filters are known in the art. In a number of types of apparatus for treating textile material with circulating air a flat filter frame is placed in the path of each stream of returned air; this filter frame is cleaned or replaced from time to time by the maintenance staff, the interior of such apparatus for treating textile material with circulating air being accessible by means of doors. The cleaning or replacement of such a filter is often omitted because of a certain degree of inconvenience—which results in undesirable blockages and greatly reduced efficiency in the treatment of textile material with circulating air.

In German Auslegeschrift No. 100458 apparatus for treating textile material with circulating air is proposed in which a filter screen is held level and an extraction and cleaning nozzle is provided which extends diagonally over the filter screen. There are essentially two ways in which this arrangement can operate; on the one hand the extraction and cleaning nozzle can be moved along on the fixed filter screen and on the other hand the extraction and cleaning nozzle can be held in a fixed position whilst the filter screen is gripped widthways with its ends wound on rollers and can be wound to and fro between these winding rollers. A collecting chamber which serves as a fibre trap is provided in the base of the apparatus and must be emptied from time to time. However, for this operation the apparatus must be shut down since the collecting chamber is located in the hot interior of the apparatus and cannot be reached otherwise. In addition to this considerable disadvantage there is also the drawback that the filter screen which is arranged in the path of the circulating air immediately before the heat exchanger provides a relatively small filter surface area and thus causes a correspondingly large pressure drop in the stream of circulating air.

The object of the invention, therefore, is to provide apparatus of the type referred to which is of relatively simple design and is distinguished by a largely maintenance-free and extremely reliable construction.

In apparatus for treating textile material with circulating air according to the invention almost all of the surface of the peripheral casing constitutes the filter surface, and the circulating air passes through it from the outer periphery towards the interior of the drum, leaving the interior of the drum at one end in the direction of the circulating air channel. In comparison with the known construction, such a drum filter, which can constitute a type of continuation of the circulating air channel, provides a relatively large filter surface so that the circulating air can pass through this fibre filter at a relatively low rate, which results in less solid fibre deposition on the upper surface of the filter and thus also provides a more favourable extraction and cleaning capacity. At the same time, however, the blower which produces the stream of circulating air can be constructed from the outset with a slight negative pressure, and is thus more economical.

An ejector which is operated by compressed air is associated with the extraction and cleaning nozzle and therefore the surface of the drum filter can be cleaned off extremely effectively with a relatively small quality of air. This ejector can be connected either to an existing compressed air system or to a separate compressed air system.

It is particularly advantageous if the filter element associated with the extraction and cleaning nozzle and the ejector is formed by a filter bag provided with a quick-change closure and is located approximately adjacent to the circulating air channel inside the apparatus. The fresh air which comes out of the filter bag and is supplied as compressed air from the ejector can also flow in an advantageous manner towards the stream of circulating air as a part of the fresh air which is necessary anyway. The filter bag itself can be advantageously positioned inside the housing of the apparatus so that it can be replaced rapidly and without hindrance at any time without shutting down the apparatus.

It should be pointed out at this stage that the apparatus according to the invention for treating textile material with circulating air in a single zone and having the parts yet to be described constitutes the smallest individual structural or basic unit. However, in its embodiment as a tentering frame dryer or the like there will be a plurality of zones for treating textile material with circulating air which are arranged one behind another in the direction of transport of the length of material, and each of the said zones—as is known per se—will contain two circulating air systems each having the parts of the basic unit. In this embodiment it is also advantageous according to the invention if each drum filter has its own rotary drive and all the filter drives and all the ejectors associated with the extraction and cleaning nozzles are connected to a common control mechanism in such a way that only one filter drive with its associated ejector can be actuated at any one time and the filter drives and the associated ejectors of all the circulating air systems can be switched on in sequence. In apparatus of this construction only a relatively low power consumption is required for driving and cleaning off the filter and it is only necessary to provide a relatively small compressor or compressed air connection with a correspondingly low drive power in order to produce the compressed air from the ejector.

Further details and advantages of the invention are disclosed in the following description and the accompanying drawings in which:

FIG. 1 shows a simplified side view of a tentering frame dryer with a plurality of zones for treating textile material with circulating air;

FIG. 3 is a schematic illustration intended merely to explain the extraction and cleaning nozzle with its associated ejector and filter bag;

Figure 2:
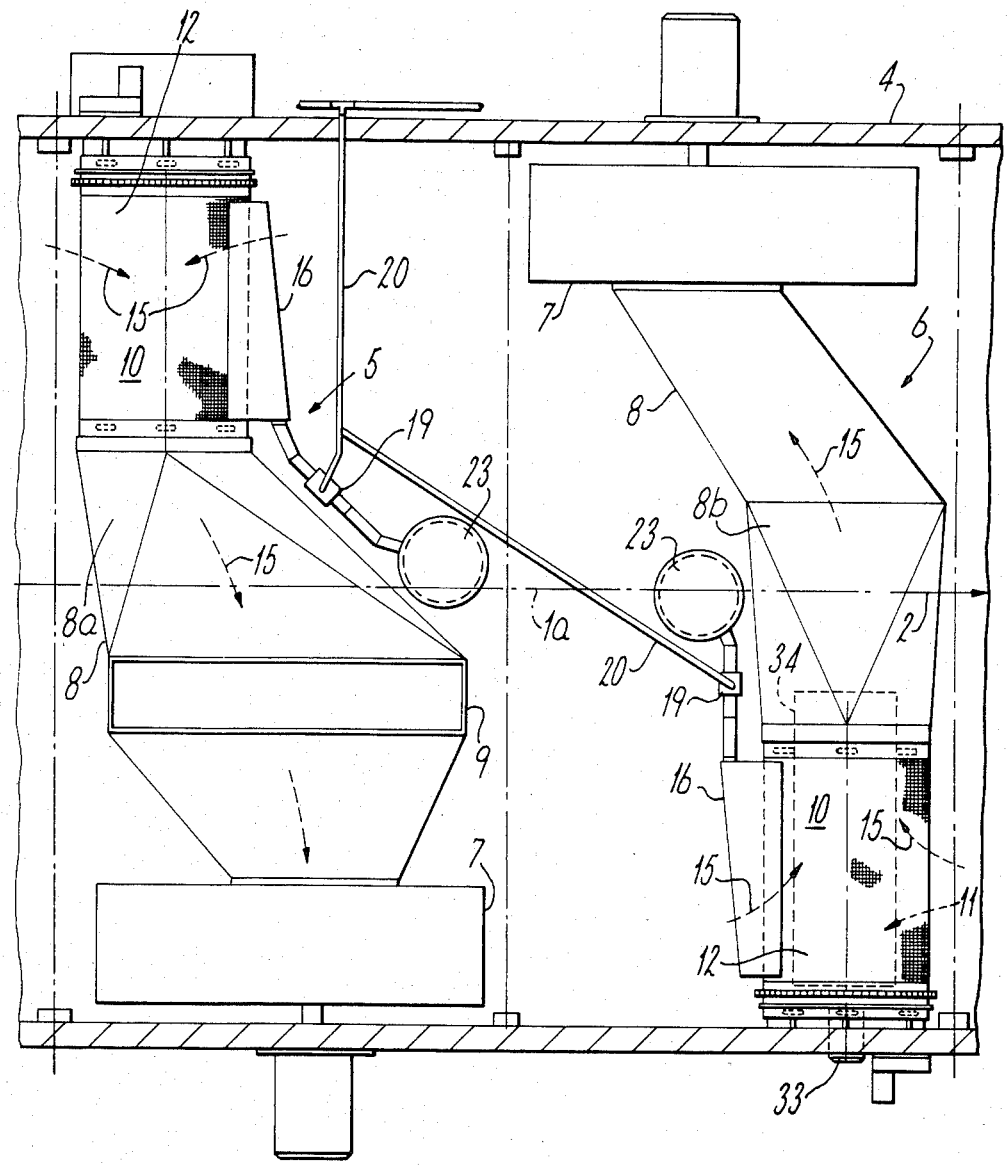
FIG. 2 shows a simplified plan view of a zone for treating textile material with circulating air with the housing cover removed, the heat exhangers which operate in different ways being provided in this treatment zone.

FIG. 1 shows a tentering frame dryer 1 in an overall side view which can be of generally conventional construction and is intended for the treatment with circulating air of a length of textile material 3 which is transported by conventional means in the direction of the arrow 2 and is merely indicated by dash-dot lines. Viewed in the direction of transport of the length of material (arrow 2), the tentering frame dryer 1 contains an inlet zone EF, a plurality of zones F1, F2 . . . Fn arranged one behind another for treating the textile material with circulating air and an outlet zone AF which is only indicated in the drawings. The treatment zones F1 to Fn are arranged inside the dryer housing 4 behind one another in the longitudinal direction thereof and are of substantially similar construction.

Only one treatment zone F2 will therefore be described in greater detail with the aid of FIG. 2. Two separate circulating air systems 5, 6 are arranged one behind another—viewed in the direction of transport of the length of material (arrow 2)—in the treatment zone. These circulating air systems 5, 6 of a tentering frame dryer are generally constructed in a similar manner as unit parts and the individual parts of the system are simply arranged in mirror image relative to each other in order to be able to ensure a uniform air treatment over the whole width of the material. However, since for the sake of simplicity two different heat exchanger constructions which can be used in the tentering frame dryer are to be described with the aid of FIG. 2, the circulating air systems 5, 6 are correspondingly shown differently.

With regard to the basic construction of the two different circulating air systems 5, 6 it should be stated that the circulating air system 5 contains a blower 7 to produce the stream of circulating air, a circulating air channel 8 connected to the intake side of the blower 7, and indirectly heating heat exchanger 9 associated with the circulating air channel 8 and a fibre filter 10 provided in the path of the circulating air on the intake side of the blower 7. In a similar manner the circulating air system 6 also has a blower 7 to produce the stream of circulating air, a circulating air channel 8 connected to the intake side of the blower 7 and a fibre filter 10 provided in the path of the circulating air on the intake side of the blower 7, whilst in this case a directly heating heat exchanger 11 is arranged substantially inside the fibre filter 10, as will be explained in greater detail below. The parts designated by the same reference numerals in the circulating air systems 5 and 6 are preferably of similar construction in the two systems.

The construction of the fibre filter 10, which is of greatest interest here, will be described with the aid of FIGS. 3 to 5. The fibre filter is constructed in the form of a rotatable drum filter 10 in which the peripheral casing 12 has a cylindrical outer surface and essentially forms the actual filter surface. The peripheral casing 12 contains an inherently stable supporting frame 13 over which a filter mesh 14 is stretched; this filter mesh can be of any suitable mesh construction, but a fine steel filter mesh is particularly preferred. If the supporting frame 13 does not sufficiently ensure that the cylindrical peripheral casing 12 is true to shape or if a particularly stable support for the filter mesh 14 is desired from the start, it can also be advantageous if a large-meshed support netting which is firmly connected to the supporting frame 13 is provided between the supporting frame 13 and the filter mesh 14.

The drum filter 10 is arranged with its longitudinal axis 10a approximately at right angles to the vertical longitudinal central plane 1a of the tentering frame dryer 1, that is to say athwart of the dryer. The streams of circulating air indicated by the broken arrows 15 can thus flow in an extremely favourable manner radially inwards from almost the entire outer peripheral surface through the filter mesh 14, the discharge side of the drum filter 10 being connected by means of its open inwardly directed end 10b to the circulating air channel 8.

An extraction and cleaning nozzle 16 which extends over approximately all of the axial length of the peripheral casing 12 is arranged in a fixed position on the outer peripheral surface of the peripheral casing or the associated filter mesh 14 a small distance away therefrom. As can be seen in FIG. 5, this extraction and cleaning nozzle 16 is a type of slotted nozzle in which—viewed in the peripheral direction of the peripheral casing 12—a short cover plate 18, 18a is provided in front of and behind the nozzle slot 17 in order to enhance the extraction effect of the nozzle 16.

An ejector 19 which is operated by compressed air is associated with the extraction and cleaning nozzle 16 and—cf. in particular FIGS. 2 and 3—is connected by a compressed air line 20 (which is merely indicated) to a compressed air source which is not shown in greater detail but which can be a separate air compressor or an existing compressed air network. The supply of compressed air is controlled by means of valves which are known per se in a manner to be explained below. In all cases the intake side 19a of the ejector 19 is connected by means of a pipe connection 21 to the extraction and cleaning nozzle 16 and the discharge side 19b of the ejector 19 is connected by means of a further pipe connection 22 to an air filter element which is preferably a filter bag 23. This filter bag 23 can be made from any suitable filter material consisting of temperature-resistant fibres; so-called Aramid fibre mesh has proved particularly suitable for this. This filter bag—like all the other parts of the extraction and cleaning nozzle 16—is retained inside the dryer housing 4 (approximately adjacent to the circulating air channel 8) and has a snap closure which is merely indicated at 24 so that in case of need it can be replaced quickly and easily. The compressed air (cf. broken arrow 25) streaming through the filter bag 23 is free from fibres and can flow as part of the fresh air into the interior of the housing 4 or into the stream of circulating air of the relevant circulating air system 5 or 6.

Figure 4:
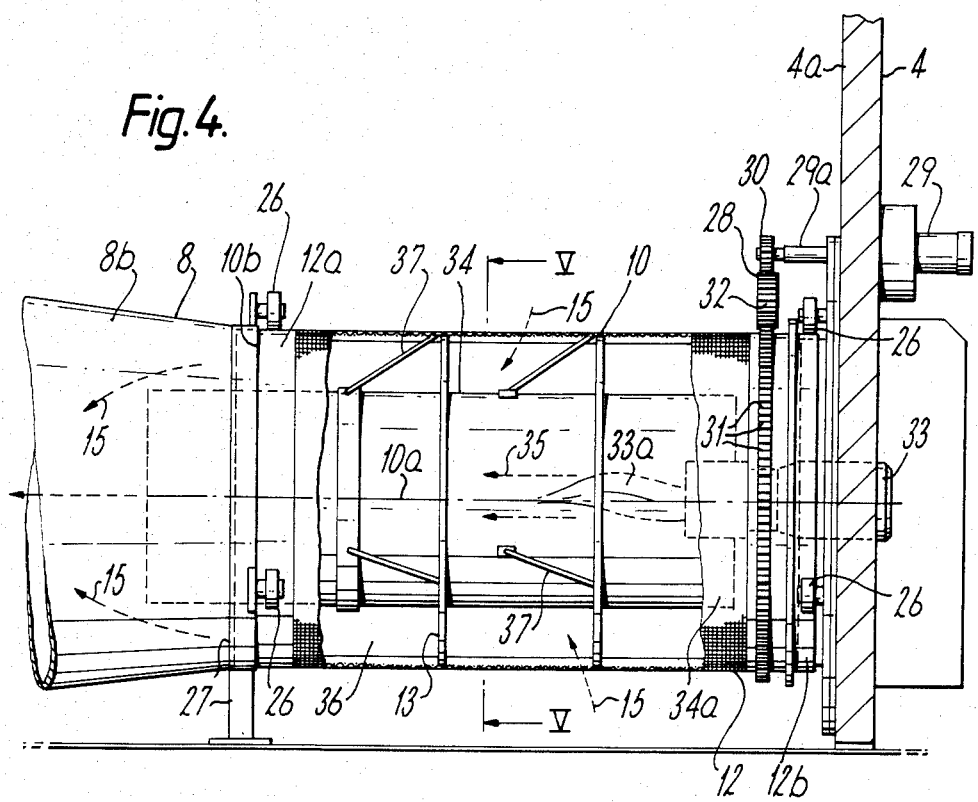
FIG. 4 shows a vertical section on an enlarged scale of a detail of the apparatus with the drum filter associated with a heat exchanger providing direct heat.
Figure 5:
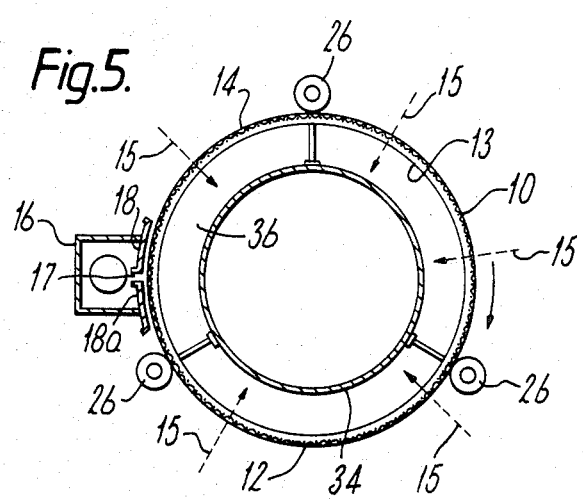
FIG. 5 shows a cross-sectional view along the line V—V in FIG. 4.

FIGS. 4 and 5 also show that the drum filter 10 or the peripheral casing 12 thereof has an axially short closed guide section 12a, 12b at opposite ends, these casing guide sections being guided by a plurality of guide rollers 26 which are retained in a fixed position and distributed over the periphery of the casing so that the guide sections are rotatable and capable of limited axial movement. Naturally, other suitable guide elements, for example slide shoes, can be provided in place of the guide rollers; in any case, however, a reliable rotational support must be ensured. A frame 27 which is supported on the base and at the same time supports the relevant end of the circulating air channel 8 (as shown in FIG. 4) can be provided for the guide rollers 26 supporting the casing guide section 12a lying further inside the dryer housing.

A drum filter rotary drive 28 which ensures a form-locking rotary drive transmission and ensures periodic driving of the drum filter 10 by at least one revolution in each case is associated with the outer casing guide section 12b adjacent to the outer wall 4a of the dryer housing 4. The rotary drive 28 essentially contains a drive motor 29 mounted on the outer housing wall 4a, a gear 30 mounted on the motor shaft 29a, gears 31 distributed at regular intervals over the outer periphery of the said outer casing guide section 12b and a drive gear 32 function to drive the drum filter. The drive motor 29 can be of any suitable construction, in particular a compressed-air motor or an electric motor. The guide rollers 26 for the outer casing guide section 12b can also be retained on the outer housing wall 4a.

As regards the construction and arrangement of the different heat exchangers 9 and 11 in the circulating air systems 5 and 6, first of all the construction in the circulating air system 5 will be described: as has already been mentioned above, the heat exchanger used in the circulating air system 5 is a heat exchanger 9 which heats the circulating air stream indirectly, that is to say that this heat exchanger 9 can be of conventional construction, installed directly in the flow path of the circulating air stream (cf. arrows 15) and can be operated for example using steam or water as heat exchange medium. The circulating air flows through the heat exchanger and is thereby heated or cooled (in the cooling zone). Viewed in the direction of flow of the circulating air (arrows 15) the drum filter 10 is arranged upstream of the heat exchanger 9 and connected thereto by means of a transitional section 8a of the circulating air channel 8 which widens in the direction of flow of the circulating air.

The second possibility as regards the construction of a heat exchanger for use in a circulating air system will now be described on the basis of the circulating air system and FIG. 2 (left-hand half) and FIGS. 4 and 5.

In the foregoing description of FIG. 2 it has been stated that the heat exchanger in the circulating air system 6 is a heat exchanger 11 which directly heats the circulating air stream. This heat exchanger 11 contains a gas or oil fired burner 33 which is known per se and operates directly in the circulating air stream (arrows 15) by means of its flame 33a. Like the drum filter rotary drive 28, the burner 33 is also retained on or in the associated outer wall 4a of the dryer housing 4. Inside this dryer housing 4 the burner 33 and particularly the flame 33a thereof is enclosed by one outer axial end 34a of a flame conduit 34 which is arranged concentrically inside the drum filter 10 or inside the peripheral casing 12 thereof. This approximately cylindrical flame conduit 34 extends in the axial direction out of the region of the burner 33 or the outer housing wall 4a at least to the discharge end 10b of the drum filter 10 but preferably further (as indicated in FIGS. 2 and 4). The diameter of the flame conduit 34 is such that on the one hand it guides the combustible gases (arrows 35) approximately centrally into the adjoining section 8b of the circulating air channel 8 and on the other hand together with the inner peripheral surface of the drum filter casing 12 provides a sufficiently large annular flow chamber 36 for the circulating air (arrows 15). The flame conduit 34 is preferably connected to the drum filter 10 so as to be fixed against relative rotation and is attached to the supporting frame 14 by means of retaining rods 37 or the like in such a way that it can expand freely (as a result of changes in temperature) inside the peripheral casing 12. In this connection it should be pointed out that the sections 12a and 12b of the peripheral casing 12 of the drum filter are retained by the guide rollers so that they are not only rotatable but are also capable of limited axial movement so that temperature-contingent alterations in the length of the casing can be taken into account without restricting the rotational movement of the drum filter 10.

In the tests on which the invention is based it was shown that the coaxial arrangement of the burner 33 and the flame conduit 34 relative to the drum filter 10 not only provides considerable structural advantages (extremely compact accommodation) but also has an advantageous effect as regards an optimum degree of heat exchange efficiency. In the arrangement of the drum filter 10 with the burner 33/flame conduit 34 as described the hot gas produced by the burner is introduced coaxially into the circulating air stream flowing out of the annular flow chamber 36, which results in almost all-round onward flow of the hot gas with extremely rapid and effective intermixing of circulating air and hot gas.

As had already been explained above, the tentering frame dryer 1 or corresponding apparatus for treating textile material with circulating air can be constructed with any number of treatment zones or circulating air systems as unit parts, and the smallest unit part could consist of a circulating air system (5 or 6). With regard to the tentering frame dryer 1 described with the aid of FIGS. 1 to 5 it may be assumed that a large number of treatment zones (F1, F2 . . . Fn) each having two circulating air systems 5, 6 are provided. Each drum filter 10 has its own rotary drive 28, and all these rotary drives 28 and all the ejectors 19 associated with the extraction and cleaning nozzles 16 are preferably connected to a common control arrangement 38 (indicated in FIG. 1) in such a way that in each case only one drum filter rotary drive and the associated ejector are actuated at the same time and these rotary drives and the associated ejectors of all circulating air systems 5, 6 can be switched on in sequence. In practice this means that the drum filters 10 are switched on in sequence in order to clean off fluff or fibres for which they carry out one or two (optionally several) revolutions and in each case the appertaining extraction and cleaning nozzle 16 becomes effective. In this way the extraction and cleaning nozzle 16 or the associated ejector 19 can carry out the suction cleaning of the peripheral casing of the filter with a relatively low air requirement (e.g. 2 Nm$^3$/min) from a common compressed air source. This means an extremely low energy and compressed air requirement for the whole tentering frame dryer 1. In a similar manner the apparatus can also be provided for example as a fixing machine.

I claim:

1. Apparatus for the air treatment of textile material comprising a housing; means for moving a length of material continuously through said housing; an air blower in said housing for moving air through the textile material and thereby entraining fibers from said textile material; a rotary drum in said housing downstream of the textile material; duct means communicating between said blower and said drum for establishing in said housing a circulating air stream therebetween; a fibre filter carried by said drum for rotation therewith; means rotatably mounting said drum in such position that said air stream passes through said fibre filter, thereby enabling fibres to collect on a surface of said fibre filter; a cleaning nozzle in close proximity to said surface of said fibre filter and extending axially over the length thereof; an air filter in said housing; a conduit coupling said nozzle to said air filter; ejector means accommodated in said conduit between said nozzle and said air filter for establishing a flow of air from said nozzle toward said air filter; and means coupling said ejector means to a source of pressure fluid, whereby said nozzle is operable to remove fibres from said fibre filter surface and deposit them on said air filter.

2. Apparatus according to claim 1 wherein said surface is the outer periphery of said fibre filter.

3. Apparatus according to claim 1 wherein said rotary drum comprises a supporting frame and said fibre filter comprises a mesh encircling said frame, said frame having its opposite ends extending beyond said mesh and forming guide sections.

4. Apparatus according to claim 3 including guide members fixed to said housing and engaging said guide sections.

5. Apparatus according to claim 1 including a heat exchanger mounted in said housing in the path of said air stream.

6. Apparatus according to claim 5 wherein said heat exchanger is downstream from said drum filter and is connected thereto by a transitional duct which widens in the direction of flow of said air stream.

7. Apparatus according to claim 5 wherein said heat exchanger includes a burner substantially coaxial with said drum and wherein said drum has an annular flame conduit therein extending axially of said drum.

8. Apparatus according to claim 7 wherein an annular flow chamber for said air stream is provided between said flame conduit and the inner peripheral surface of said drum.

9. Apparatus according to claim 5 wherein said heat exchanger includes indirect heating means for said air stream.

10. Apparatus according to claim 5 wherein said heat exchanger includes direct heating means for said air stream.

11. Apparatus according to claim 1 wherein said filter includes a filter bag, and quick-change means connecting said filter bag to said conduit.

12. Apparatus according to claim 1 wherein said housing includes a plurality of individual zones, each of which includes said apparatus for the air treatment of textile material.

13. Apparatus according to claim 7 wherein said flame conduit extends axially beyond said drum in the direction of flow of said air stream.

* * * * *

UNITED STATES PATENT AND TRADEMARK OFFICE
CERTIFICATE OF CORRECTION

PATENT NO. : 4,538,361
DATED : September 3, 1985
INVENTOR(S) : Harry Gresens

It is certified that error appears in the above-identified patent and that said Letters Patent are hereby corrected as shown below:

Column 1, line 37, change "100458" to -- 1004581 --.

Column 2, line 17, change "quality" to -- quantity --.

Column 8, line 2, change "drum" to -- fibre --.

Column 8, line 19, after "said" insert -- air --.

Signed and Sealed this

Third Day of December 1985

[SEAL]

Attest:

DONALD J. QUIGG

Attesting Officer        Commissioner of Patents and Trademarks